United States Patent [19]

Nishii et al.

[11] Patent Number: 5,027,599
[45] Date of Patent: Jul. 2, 1991

[54] HYDRAULIC BRAKING SYSTEM

[75] Inventors: Michiharu Nishii, Toyota; Genji Mizuno, both of Toyake; Ysohihiko Tada, Hazu; Yoshihisa Nomura, Toyota; Masahiko Kato, Nagoya; Kenji Shirai, Mishima; Junichi Tanoue, Susono, all of Japan

[73] Assignee: Aisin Seiki Kabushiki Kaisha, Aichi, Japan

[21] Appl. No.: 259,744

[22] Filed: Oct. 19, 1988

[30] Foreign Application Priority Data

Oct. 19, 1987 [JP] Japan .............................. 62-263546
Oct. 19, 1988 [JP] Japan .............................. 62-263545

[51] Int. Cl.$^5$ .......................... B60T 8/64; B60T 8/48
[52] U.S. Cl. ............................ 60/547.1; 60/562; 60/563; 60/589; 303/114; 303/119
[58] Field of Search .............. 60/547.1, 562, 563, 60/566, 589; 303/9.61, 114, 119

[56] References Cited

U.S. PATENT DOCUMENTS 4,472,941 9/1984 Schopper et al. ............... 60/591 X
4,729,610 3/1988 Seibert et al. .................. 60/547.1 X

FOREIGN PATENT DOCUMENTS

2230418  1/1973  Fed. Rep. of Germany ..... 60/547.1
59-209948 11/1984 Japan .
59-227552 12/1984 Japan .
62-155167  7/1987 Japan .

*Primary Examiner*—John T. Kwon
*Assistant Examiner*—George Kapsalas
*Attorney, Agent, or Firm*—Burns, Doane, Swecker & Mathis

[57] ABSTRACT

A hydraulic braking system includes a tandem master cylinder having a bore with an opening and a closed wall at opposite ends thereof which formed in a housing, a first piston slidably fitted in the bore so as to define a first pressure chamber and a first fluid chamber therein and operatively connected to a brake pedal, a second piston slidably fitted in the bore so as to define a second fluid chamber adjacent to the first pressure chamber and a second pressure chamber and operatively connected to the first piston. A normally open valve communicates with each piston so as to close passages formed in the each pistons and communication between each fluid chambers and each pressure chambers, respectively, when each piston is moved in response to the depression of the brake pedal. A power source generates a hydraulic power pressure. A dynamic hydraulic braking pressure generator generates the hydraulic power pressure supplied from the power source in response to depression of the brake pedal and outputs to the second fluid chamber. A plurality of wheel cylinders for braking respective road wheels are divided into a first group of wheel brake cylinders communicated with the first pressure chamber through one of dual hydraulic circuits and a second group of wheel brake cylinders communicate with the second pressure chamber through an another of the dual hydraulic circuits. A restrictor restricts the sliding distance of the second piston toward the first piston to at least a predetermined distance for closing the valve means. Due to such construction, the first stage idle stroke of the tandem master cylinder is shortened and the stroke of the brake pedal is shortened.

10 Claims, 4 Drawing Sheets

HYDRAULIC BRAKING SYSTEM

BACKGROUND OF THE INVENTION

1. Field of the Invention

The present invention relates to a braking system for use in an automotive vehicles and particularly to a hydraulic braking system comprising a tandem master cylinder and a dynamic hydraulic braking pressure generator which outputs hydraulic power pressure supplied from a power source in response to the depression of a brake pedal.

2. Description of the Prior Art

In a conventional service braking system for an automotive vehicle, there is provided a plurality of hydraulic circuits connecting wheel brake cylinders mounted on road wheels with a hydraulic braking pressure generator such as a master cylinder, so that when one of the hydraulic circuits is broken or otherwise inoperative, normal braking operation is achieved by the rest of the hydraulic circuits. In general, a tandem master cylinder is used in a conventional dual circuit system.

In order to reduce the force required to operate a brake pedal during braking operation, the hydraulic braking system is provided with a servo unit which is referred as a servo or a booster and which utilizes compressed air, intake manifold vacuum (for a vacuum booster), or hydraulic pressure (for a hydraulic booster) as a power source. The hydraulic booster is a booster which actuates the hydraulic braking pressure generator such as the master cylinder by the hydraulic power pressure supplied from the power source in response to depression of the brake pedal. For example, the Japanese Patent Laid-open Publication No. 59-209948 has disclosed a system providing the hydraulic booster to the tandem master cylinder which operates as the ordinary tandem master cylinder while the hydraulic booster is not operated.

With use of such hydraulic booster, it has been proposed to use the hydraulic booster, in the hydraulic braking system, as a dynamic hydraulic pressure generator in addition to the master cylinder. In other words, a hydraulic pressure boosted by the booster (hereinafter referred to as boost pressure), in response to the depression of the brake pedal, is applied directly to a hydraulic circuit. For example, as shown in Japanese Patent Laid-open Publication No. 59-227552, boost pressure of the hydraulic booster is applied to rear wheel brake cylinders in a front-rear dual circuit system in order to reduce the stoke of the brake pedal.

Further, regarding the hydraulic braking pressure generator provided with the tandem master cylinder and the hydraulic booster, it has been proposed to connect one of the pressure chambers of the tandem master cylinder with the wheel cylinders of the one of the hydraulic circuits and to output the boost pressure of the hydraulic booster to the wheel cylinders of the other of the pressure chambers of the tandem master cylinder. Such hydraulic braking system is disclosed in Japanese Patent Laid-open Publication No. 62-155167. According to this system, various effects such as the shortening of the stroke of the brake pedal and so on are obtained.

However, such prior art explained earlier (Japanese Patent Laid-open Publication No. 52-227552) is accompanied by a problem that if the hydraulic power pressure is lost during operation of the power source, the braking force of the rear wheels is lost, although the braking force of the front wheels can be maintained by the master cylinder.

On the contrary, according to the prior art explained later, in case of the loss of the hydraulic power pressure, the system functions as the ordinary tandem master cylinder and the braking force of all the wheels can be maintained. In the prior art explained later, however, since the tandem master cylinder is the type which utilizes a compensating port communicating with the reservoir and the sliding operation of a piston controls the open-closed compensating port, even though a second piston slides toward the first piston and the brake pedal at the first stage of the brake operation, the first piston, the first pressure chamber and the hydraulic circuit communicated with the first pressure chamber are not influenced. That is, the above movement of the second piston is not concerned with the shortening of the stroke of the brake pedal and the shortening of the stroke of the brake pedal is limited to directly effect the utilization of the hydraulic booster which is the dynamic hydraulic braking pressure generator. Accordingly, in this system, the first stage idle stroke exists when the first piston is operated and it is to further shorten the stroke of the brake pedal.

Further, in the prior art explained later, when the brake pedal is depressed suddenly, the two pistons are slidably moved and the hydraulic braking pressure is outputted from the two pressure chambers before the boost pressure of the hydraulic booster is supplied to the tandem master cylinder. Subsequently, the boost pressure of the hydraulic booster is supplied to the supply chamber of the second piston of the tandem master cylinder after two pistons are slidably moved. As a result, the urging force toward the brake pedal adds to the first piston which was sliding toward to the second piston and a reaction is generated in the brake pedal. This reaction does not cause a hindrance to the braking operation, but the brake feeling deteriorates.

SUMMARY OF THE INVENTION

It is, therefore, an object of the present invention to provide an improved hydraulic braking system which is able to further shorten the stroke of the brake pedal by decreasing the idle stroke of the tandem master cylinder without being limited to the shortening of the stroke of the brake pedal due to application of the output pressure of the dynamic hydraulic braking pressure generator to the one of the hydraulic circuits.

It is another object of the present invention to provide an improved hydraulic braking system which is able to shorten the stroke of the brake pedal by the application of the output pressure of the dynamic hydraulic braking pressure generator to the one of the hydraulic circuits and to ensure the smooth braking operation without generating a reaction to movement of the brake pedal when the brake pedal is depressed suddenly.

It is a further object of the present invention to provide an improved hydraulic braking system including a tandem master cylinder having a bore with an opening and a closed wall at opposite ends thereof, a first piston slidably fitted in the bore so as to define a first pressure chamber and a first fluid chamber therein and operatively connected to a brake pedal, a second piston slidably fitted in the bore so as to define a second fluid chamber adjacent to the first pressure chamber and a second pressure chamber and operatively connected to the first piston, normally open valve means disposed in each of the pistons so as to close passage means formed in each of the pistons and communicated between each fluid chamber and each pressure chamber, respectively, when each piston is slidably moved in response to the depression of the brake pedal, a power source for generating a hydraulic power pressure, a dynamic hydraulic braking pressure generator which generates the hydraulic power pressure supplied from the power source in response to depression of the brake pedal and outputs to the second fluid chamber, a plurality of wheel cylinders for braking respective road wheels and divided into a first group of wheel brake cylinders communicated with the first pressure chamber through an one of the hydraulic circuits and a second group of wheel brake cylinders communicated with the second pressure chamber through another of the hydraulic circuits, and restricting means for restricting the sliding distance of the second piston toward the first piston to at least a predetermined distance for closing the valve means.

The above-described hydraulic braking system according to the present invention may be comprised of the two hydraulic circuits by a first hydraulic passage communicating the first pressure chamber with the first group of wheel cylinders, a second hydraulic passage communicated with the second pressure chamber, a third hydraulic passage communicated with the dynamic hydraulic braking pressure generator and a fourth hydraulic passage communicated with the second group of wheel brake cylinders and may further comprise a changeover valve which is changed between a first position communicating the second hydraulic passage with the fourth hydraulic passage and closing the third hydraulic passage and a second position communicating the third hydraulic passage with the fourth hydraulic passage and closing the second hydraulic passage in response to the braking operation, and which is placed in the second position when the braking operation is started.

BRIEF DESCRIPTION OF THE DRAWINGS

Additional objects and advantages of the present invention will become more apparent from the following detailed description of preferred embodiments thereof when considered with reference to the attached drawings, in which.

DETAILED DESCRIPTION OF THE PREFERRED EMBODIMENTS

A hydraulic braking system constituted in accordance with a preferred embodiment of the present invention will be described with reference to the drawings.

Figure 1:
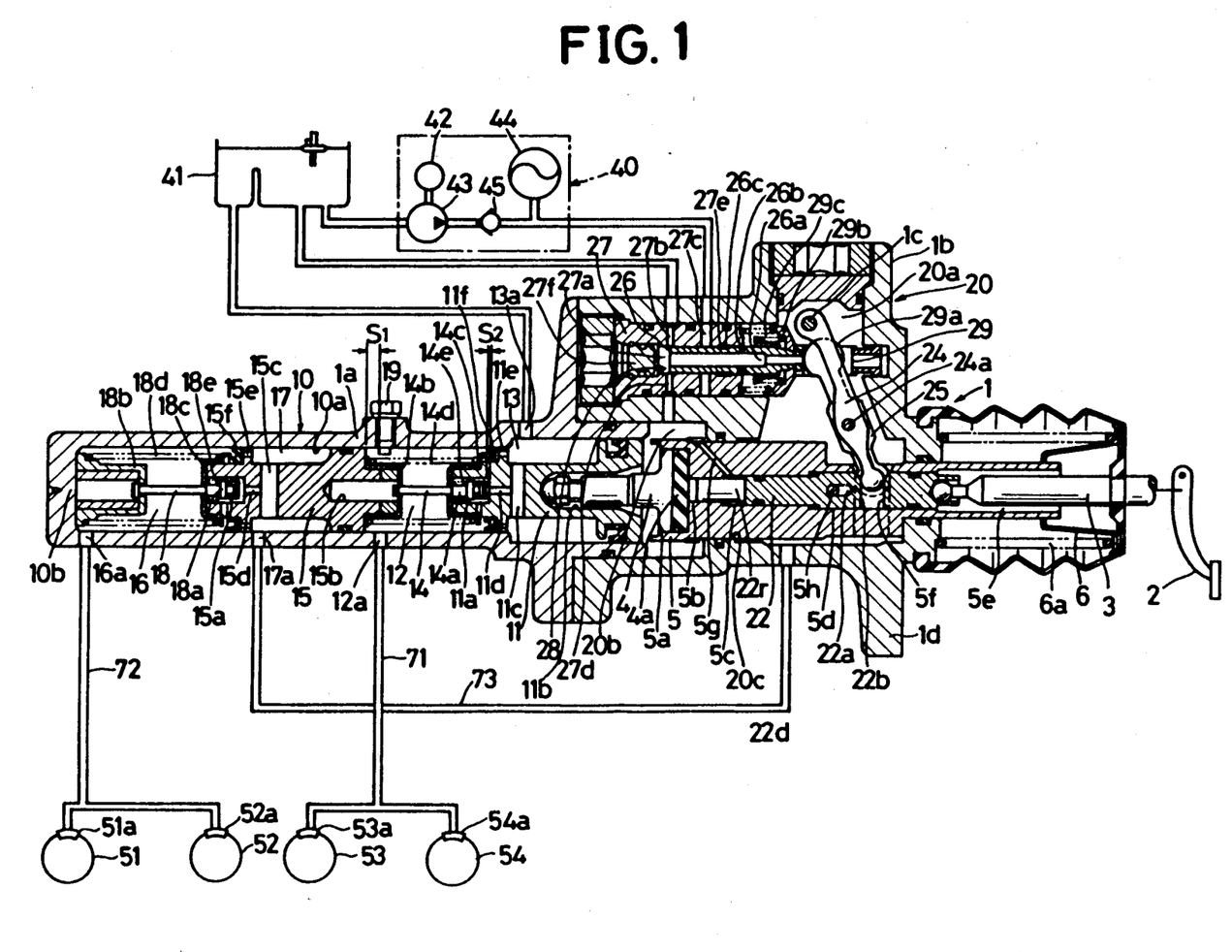
FIG. 1 is a schematic illustration of a hydraulic braking system of a first embodiment of the present invention.

Referring to FIG. 1, there is schematically illustrated a hydraulic braking pressure generator 1 which includes a tandem master cylinder 10 and a hydraulic booster 20.

This hydraulic booster 20 is utilized as a dynamic hydraulic braking pressure generator of the present invention. As a result, a depression force applied on a brake pedal 2 is transmitted as brake operating force to an input rod 3, and in response to this brake operating force, hydraulic pressure introduced from a power source 40 or a reservoir 41 is appropriately regulated and applied to wheel cylinders 51a and 52a (53a and 54a) of front wheels 51 and 52 (rear wheels 53 and 54) through a first hydraulic passage 71 (a second hydraulic passage 72).

The tandem master cylinder 10 includes a housing 1a with a bore 10a. In the bore 10a, a first piston 11 and a second piston 15 are slidably and fluid-tightly fitted. At opposite ends of the first piston 11, there is formed a large-diameter land and a small-diameter land. A right side of the bore 10a is formed into a stepped configuration so as to receive the first piston 11. Between both lands of the first piston 11, a first fluid chamber 1 is defined in the large-diameter portion of the bore 10a. Between the second piston 15 and the small-diameter land of the first piston 11, a first pressure chamber 12 is defined in the small-diameter portion of the bore 10a. The first pressure chamber 12 is in fluid communication with the first hydraulic passage 71 through a port 12a and the first fluid chamber 13 is in fluid communication with the reservoir 41 through a port 13a.

The first piston 11 has holes 11a and 11b extending axially from its opposite ends towards its center, respectively, and a hole 11c formed radially and communicated with the hole 11a through a small hole 11d. The hole 11a is opened into the first pressure chamber 12 and the hole 11c is opened into the first fluid chamber 13. Axial holes 11e are formed in the small-diameter land of the first piston 11 and a cup seal 11f is fitted on the first piston 11 so as to cover opening ends of holes 11e of the first pressure chamber 12. As a result, a check valve is constituted by holes 11e and cup seal 11f. A valve member 14a mounted on a right end of a valve rod 14 is movably received in the hole 11a of the first piston 11 in opposing relation to the small hole 11d, and the valve member 14a is restricted from moving towards the second piston 15 by a retainer 14c mounted on the first piston 11. A large-diameter end portion of a left end of the valve rod 14 is movably received in a hole 15b formed in the second piston 15 and is restricted from moving towards the first piston 11 by a retainer 14b mounted on the right end of the second piston 15. A spring 14e is disposed between the retainer 14c and the valve rod 14 so as to urge the valve member 14a towards the small hole 11d, and a head portion of the input rod 4 is received in the hole 11b.

A return spring 14d is disposed between the retainer 14c and the retainer 14b so as to continually urge the first piston 11 and the second piston 15 away from each other. Thus, the opposite ends of the valve rod 14 are normally in engagement with the respective retainer 14b and 14c. Therefore, the valve 14a and the small hole 11d are spaced from each other. Brake fluid supplied from the reservoir 41 to the first fluid chamber 13 through the port 13a is received in the first pressure chamber 12 through the hole 11e or the holes 11c, 11d and 11a. Thus, when the first piston 11 is moved towards the second piston 15 against the urging force of the return spring 14d, the cup seal 11f and the valve member 14a close the hole 11e and hole 11d, respectively, so that the first pressure chamber 12 is held in the closed state except for a port 12a. Accordingly, the pressure of the brake fluid is raised in response to movement of the first piston 11.

The second piston 15 is disposed between a closed wall 10b at a left end of the bore 10a and the first piston 11 and is slidably and fluid tightly fitted into the bore 10a in the manner of the first piston 11. At both ends of the second piston 15, a pair of small-diameter lands are formed thereon, and a second fluid chamber 17 is defined between both lands of the second piston 15 and a second pressure chamber 16 is defined between the second piston 15 and the closed wall 10b. The second pressure chamber 16 is in fluid communication with the second hydraulic passage 72 through a port 16a and the second fluid chamber 17 is in fluid communication with the third hydraulic passage 73 through a port 17a.

Similar to the first piston 11, the second piston 15 has axial holes 15a, 15b, and a radial hole 15c. The hole 15a is in fluid communication with the hole 15c through the axial small hole 15d. Axial holes 15e are formed in the land of the second pressure chamber 16 and a cup seal 15f is fitted on the second piston 15 so as to cover opening ends of holes 15e of the second pressure chamber 16. As a result, a check valve is constituted by holes 15e and the cup seal 15f. A valve member 18a mounted on the right end of a valve rod 18 is movably received in the hole 15a of the second piston 15 in opposing relation to the small hole 15d, and the valve member 15a is restricted from moving towards the closed wall 10b by a retainer 18c mounted on the second piston 15. A large diameter end portion of the left end of the valve rod 18 is movably received in a retainer 18b and is restricted from moving towards the first piston 11 by the retainer 18b. A spring 18e is disposed between the retainer 18c and the valve rod 18 so as to urge the valve member 18a towards the small hole 15d. A return spring 18d is disposed between the retainer 18b and the retainer 18c so as to space the second piston 15 from the closed wall 10b. Thus, the valve member 18a is spaced from the hole 18d under normal conditions.

When the hydraulic booster 20, which will be described in detail later, supplies output pressure into the second fluid chamber 17 through the third hydraulic passage 73 and the port 17a, the output pressure is transmitted to the second pressure chamber 16 through the hole 15e or the small hole 15d and the hole 15a. At the same time, the urging force towards the first piston 11 acts on the land of the second piston 15 of the first pressure chamber 12 and the second piston 15 slides toward the first piston 11.

Also, while output pressure from the hydraulic booster 20 does not exist in the third hydraulic passage 73 when the first piston 11 is moved towards the second piston 15, the volume of the first pressure chamber 12 is decreased thereby increasing the pressure therein as well as the second piston 15 is moved against the urging force of the return spring 18d. Thus, the small holes 11d and 15d are closed fluid tightly by the valve members 14a, 18a, respectively, thereby increasing the pressure of the brake fluid in both pressure chambers 12 and 16.

At the housing 1a between the first piston 11 and the second piston 15, a bolt 19 is disposed and constitutes a restricting means of the present invention. A head of the bolt 19 projects into the bore 10a and restricts the movement of the second piston 15 towards the first piston 11 by the engagement with the land of the second piston 15 of the first pressure chamber 12. A distance S1 between the bolt 19 and the land of the second piston 15 of the first pressure chamber 12 which in its initial position is determined by the urging forces of return springs 14d and 18d is larger than at least a distance S2 between an open end of the small hole 11d of the first pressure chamber 12 and the valve member 14a. The distance S1 is set so as to be filled by the brake fluid of first stage into the first hydraulic passage 71 and the wheel cylinders 53a and 54a upon the decrease of the first pressure chamber 12 by the sliding movement of the second piston 15 towards the first piston 11. Thereby, the stroke of the brake pedal 2 for the initial movement of the first piston 11 towards the second piston 15 is in, what is called, a no-travel condition if the distance S1 is set to excess, the distance S1 is limited to the predetermined distance of itself.

Next, the hydraulic booster 20 is described together with a braking force input mechanism.

In a housing 1b joined with the housing 1a, a boost chamber 20a and a low-pressure chamber 20b of the hydraulic booster 20 are defined, and a power piston 5 is fluid-tightly and slidably disposed in a bore 20c which is formed between the boost chamber 20a and the low-pressure chamber 20b and is substantially coaxial with the cylinder bore 10a. The power piston 5 is provided with a retainer 6 at its end extending toward the brake pedal 2, and a spring 6a is mounted between the retainer 6 and the housing 1b so as to normally urge the power piston 5 toward the brake pedal 2. The power piston 5 has at its middle portion a shoulder portion which abuts on the housing 1b to restrict the power piston 5 from sliding toward the brake pedal 2.

In the power piston 5, a recess 5a is formed at the end facing the first piston 11, and a stepped bore is formed axially in the center. This stepped bore comprise a small diameter bore 5b, an intermediate-diameter bore 5c, a large-diameter bore 5d and an open end bore 5e. In the stepped bore, received slidably therein is a reaction rod 22r received in the small-diameter bore 5b, and a reaction piston 22 which has a small-diameter portion received in the intermediate-diameter bore 5c and a large diameter portion received in the large-diameter bore 5d. The axial length of the reaction rod 22r is larger than the length of the small-diameter bore 5b of the stepped bore. In the reaction piston 22, an elongated hole 22a is formed to extend coaxially with the axis of the reaction piston 22, and a through-hole 22b extends perpendicular to the elongated hole 22a. A pin 5h fixed to the power piston 5 is disposed in the elongated hole 22a, so that the reaction piston 22 is restricted from sliding at least toward the brake pedal 2 with respect to the power piston 5.

The large-diameter portion of the reaction piston 22 is provided with a recess at its end. One end of an input rod is connected to the brake pedal 2, and the other end of the input rod 3 is provided with a spherical head which is inserted in the open end bore 5a of the power piston 5 and received in the recess of the reaction piston 22, and is engaged with the projection formed on the inner surface of the recess. In the power piston 5, a through-hole 5f is radially formed which is aligned with the through-hole 22b when the reaction piston 22 is positioned most closely to the brake pedal 2 and which is larger in diameter than the through-hole 22b.

Between the intermediate-diameter bore 5c and the reaction rod 22r, an annular space is defined due to the difference in axial length between the reaction rod 22r and the small-diameter 5b, and is communicated with the low-pressure chamber 20b through an inclined hole 5g. The large-diameter end portion of the output rod 4 is received in the recess 5a of the power piston 5 via an elastic reaction disk 4a and is held in the recess 5a with a leaf spring. There normally exists a gap between the reaction disk 4a and the end of the reaction rod 22r. The output rod 4 is disposed in the hole 11b of the first piston 11, and the head of the output rod is in contact with the bottom surface of hole 11b.

A support lever 24 is pivotally connected at its one end to the housing 1b by a pin 1c for pivotal movement within the boost chamber 20a, and a spherical head of the support lever 24 is fitted into the through-hole 22b of the reaction piston 22. A control lever 25 is pivotally connected with the support lever 24 by a pin 24a approximately in its center, and one head of the control lever 25 is fitted into the through-hole 5f of the power piston 5. Accordingly, when the reaction piston 22 slides toward the output rod 4 with respect to the power piston 5 which is pressed toward the brake pedal 2, a rotating force is exerted on the support lever 24 so as to pivotally move the support lever 24 clockwise about the pin 1c. At this time, since one head of the control lever 25 is retained in the through-hole 5f of the power piston 5, the other head of the control lever 25 is rotated counterclockwise about the pin 24a and hence moved in the sliding direction of the reaction piston 22. As a result, the other head of the control lever 25 is displaced in response to movement of the reaction rod 22r until it comes into contact with the reaction disk 4a.

The housing 1b has a spool-valve bore extending substantially in parallel with the power piston 5 and communicating with the boost chamber 20a, and a spool valve 28 is fitted into the spool-valve bore. The spool valve 28 has a spool 26 slidable received in a spool bore 27a formed in a cylinder 27 substantially in parallel with the power piston 5, and one end of the spool bore 27a is fluid-tightly plugged by a closure member 27f. In the spool 26, a through-hole 26a is axially formed, and a hole 26b is formed radially to communicate with the through-hole 26a. One end of the spool 26 is positioned in the boost chamber 20a and is connected to one end of a control rod 29. The other end of the control rod 29 is slidably mounted on a recess formed in the housing 1b, and the head of the control lever 25 is fitted into a through-hole 29a radially bored in the control rod 29. Between the cylinder 27 and a retainer 29b formed at one end of the control rod 29, a spring 29c is mounted so as to normally urge the spool 26 toward the control lever 25. The through-hole 26a normally opens to the boost chamber 20a at the junction of the spool 26 and the control rod 29.

When the control lever 25 is in its initial position, the through-hole 26a of the spool 26 is communicated with the reservoir 41 and the low pressure chamber 20b through a hole 27b radially bored in the cylinder 27, a hole 27d communicating with the hole 27b via the peripheral groove formed around the outer surface of the cylinder 27, and the corresponding ports formed in the housing 1b. Thus, the boost chamber 20a is also communicated with the reservoir 41 and is filled with brake fluid under atmospheric pressure. A hole 27c communicating with the power source 40 is formed in the cylinder 27 with a predetermined distance from the hole 27b toward the control rod 29. The hole 27c is normally closed by the peripheral surface of the spool 26. Between the hole 27c and the end of the spool 26 facing the control rod 29, an annular groove 27e is formed on the inner surface of the cylinder 27, and an annular groove 26c is formed on the peripheral surface of the spool 26 in opposing relation to the annular groove 27e.

When the spool 26 is moved toward the closure member 27f in response to the movement of the control lever 25, the hole 27b of the cylinder 27 is closed. The hole 27c in turn faces the annular groove 26c of the spool 26, and the annular groove 27e faces the annular groove 26c and the hole 26b. Consequently, the hole 27c is communicated with the through-hole 26a. Accordingly, the hydraulic power pressure of the power source 40 is introduced into the boost chamber 20a to increase the hydraulic pressure therein, and the reaction force is thereby transmitted to the brake pedal 2 via the reaction piston 22, and at the same time increased hydraulic pressure is applied to the first piston 11 via the power piston 5. The power piston 5 moves until the pin 5h comes into contact with the elongated hole 22a at maximum with respect to the reaction piston 22. Thereby, the relative position of the control lever 25 and the support lever 24 becomes that of its initial state. Accordingly, the control lever 25 is moved clockwise about the pin 24a to retract the control rod 29 toward the brake pedal. The hole 27c of the cylinder 27 is thereby closed, and in turn the hole 27b is communicated with the hole 26a of the spool 26 to lower the hydraulic pressure in the boost chamber 20a so that the power piston 5 is moved toward the brake pedal 2. With this operation performed repeatedly, the hydraulic pressure within the boost chamber 20a is regulated to a predetermined boost pressure. Also, a port 20d which is formed in the housing 1b so as to communicate with the boost chamber 20a is in fluid communication with the second fluid chamber 17 of the tandem master cylinder 10 via the third hydraulic passage 73 and the port 17a. Accordingly, the output hydraulic pressure of the boost chamber 20a is supplied to the second fluid chamber 17.

The power source 40 comprises an accumulator 44 for generating a hydraulic power pressure along with a fluid pump 43 which is connected to the accumulator 44 via a check valve 45 and connected to the reservoir 41 which stores an amount of hydraulic fluid. The power source 40 is constituted so as to supply the power hydraulic pressure to the necessary place via the accumulator 44. The fluid pump 43 is operated by a motor 42 which is actuated by an electric control signal from an electric control device (not shown). The power hydraulic pressure is maintained to a predetermined value by means of being intermittently controlled by the motor and by the electric control device in response to the electric control signal from a pressure sensor (not shown).

The above-described embodiment of the hydraulic braking system 1 operates as follows. FIG. 1 shows a condition which the brake pedal 2 is not depressed. In this condition, since the first fluid chamber 13 which is communicated with the reservoir 41 is in fluid communication with the first pressure chamber 12 which is communicated with the wheel cylinders 53a and 54a of the rear wheel 53 and 54, the brake fluid which is filled therein (in one of the hydraulic circuits) is the same as the pressure in the reservoir 41, namely atmospheric.

On one side of the hydraulic circuit, the power hydraulic pressure of the power source 40 is supplied to the hole 27c. But, in this condition, since the hole 27c is shut, the hydraulic booster 20 is not operated.

Also, since the brake fluid in the second pressure chamber 16 and the second fluid chamber is in fluid communication with the reservoir 41 via the port 17a, the third hydraulic passage 73, the port 20d, the boost chamber 20a and the hole 27c and is under atmospheric pressure, the brake fluid in the wheel cylinders 51a and 52a which is communicated with the second pressure chamber 16 via the port 16a and the second hydraulic passage 72 is also under the same pressure.

When the brake pedal 2 is depressed, the reaction piston 22 is moved until the reaction rod 22r abuts on the reaction disk 4a of the power piston 5. The control lever is then rotated counterclockwise about the pin 24a with respect to the support lever 24 so that the head of the control lever 25 pushes the spool 26. Thereby, the hydraulic power pressure from the power source 40 is introduced into the boost chamber 20a to push the power piston 5 so as to apply the boost force to the first piston 11 so that the reaction force is transmitted to the brake pedal 2 via the reaction piston 22. At the same time, the power hydraulic pressure is supplied from the port 20d to the second fluid chamber 17 via the third hydraulic passage 73, and further the power hydraulic pressure which is supplied from the second fluid chamber 17 to the second pressure chamber 16 via the small hole 15d and the hole 15e is supplied to the wheel cylinders 51a and 52a via the second hydraulic passage 72. Also, the second piston 15 slides toward the first piston 11 against the return spring 14d by the power hydraulic pressure introduced into the second fluid chamber 17. Thereby, first of all, the valve rod 14 is separated from the retainer 14b and moves toward the small hole 11d, and then the valve member 14a closes the small hole 11d fluid tightly. The second piston 15 decreases the volume of the first pressure chamber 12 until the land of the second piston 15 abuts on the bolt 19.

Thereby, the brake fluid of first stage in the first hydraulic passage 71 and wheel cylinders 53a and 54a communicated with the first pressure chamber 12, respectively, is filled therein by the sliding of the second piston 15, and the brake hydraulic pressure is outputted to the wheel cylinders 53a and 54a as soon as the first piston 11 begins the sliding by the power piston 5. In the boost chamber 20a, the hydraulic pressure is kept in the predetermined boost pressure with the spool valve 28 operated by the control lever 25 in response to relative displacement of the power piston 5 to the reaction piston 22.

As is clear from above operation, according to this embodiment, since the brake hydraulic pressure is outputted to the wheel cylinders 51a and 52a by the hydraulic booster 20 before the first piston 11 slides, the stroke of the brake pedal 2 is shortened, and since the valve member 14a is closing the small hole 11d of the passage means between the first fluid chamber 13 and the first pressure chamber 12 of the present invention by the movement of the second piston 15 toward the first piston 11 before the first piston 11 slides, the idle stroke of the first piston 11 corresponds to the moving distance S1 of the second piston 15. Further, the brake fluid of first stage is filled into the hydraulic circuit communicated with the first pressure chamber 12 by the decrease of the volume of the first pressure chamber 12 accompanied with the sliding of the second piston 15, the stroke of the brake pedal 2 required to the decrease of the volume of the first pressure chamber is decreased. Thereby, increase of the brake hydraulic pressure is rapid and the braking force with respect to the stroke of the brake pedal is linear.

According to this embodiment, even though power hydraulic pressure may be lost or reduced by damage and so on of the power source 40 and boost force may be lost or reduced by cessation of the operation of the hydraulic booster 20, since the pressure of the first pressure chamber is increased by the sliding movement of the first second piston 15 due to the increase of the first pressure chamber 12, the fail-safe operation as the ordinary tandem master cylinder is insured.

As mentioned above, in this embodiment, since the hydraulic braking system operates the same as the ordinary tandem master cylinder, even though the power hydraulic pressure of the power source 40 has been lost, the first hydraulic passage 71 and the second hydraulic passage 72 constituting the two hydraulic circuits is connected to the front-rear wheels in opposition as a diagonal-circuit, complicated adjustment and so on is not necessary.

Figure 2:
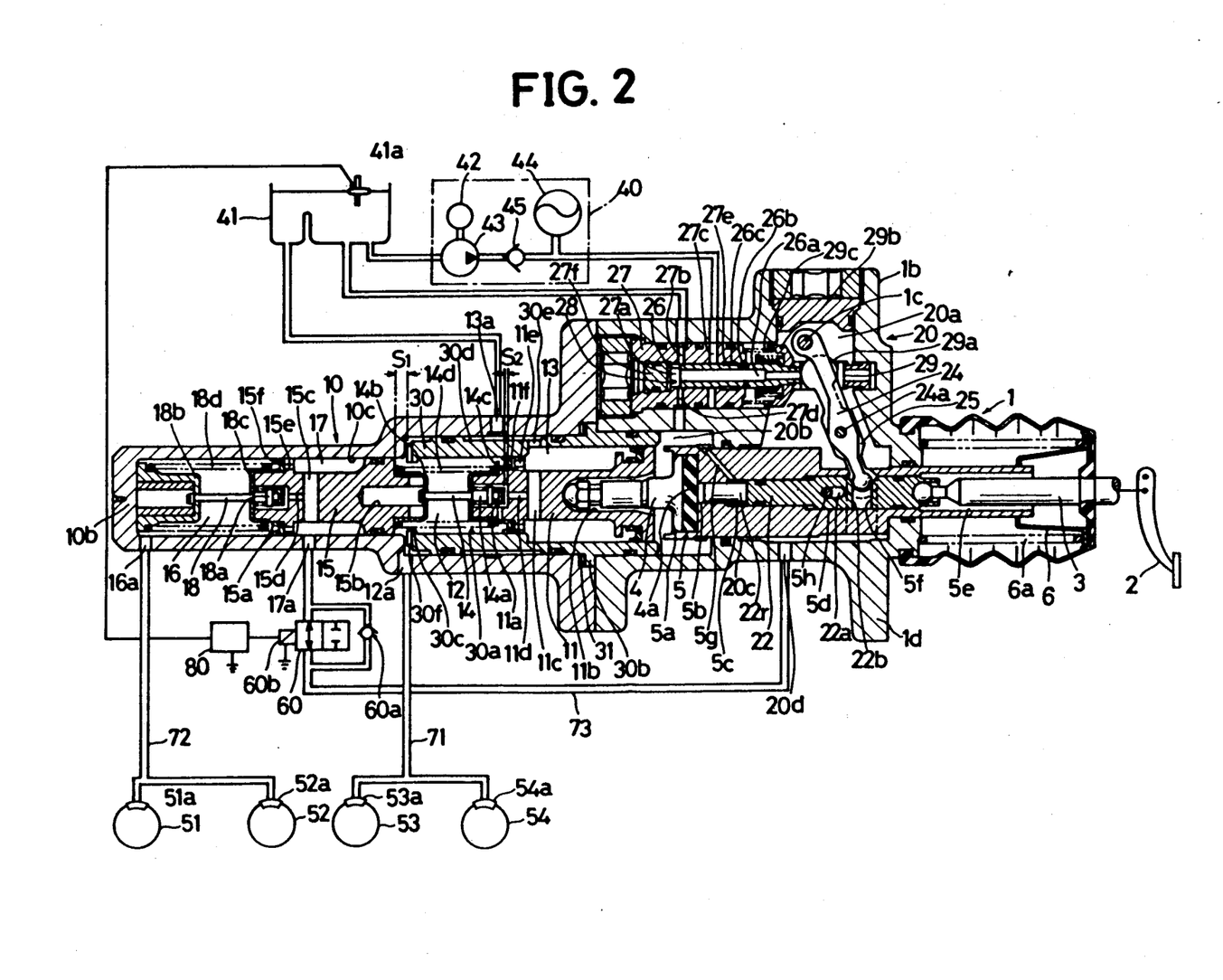
FIG. 2 is a schematic illustration of a hydraulic braking system of a second embodiment of the present invention.

FIG. 2 shows a second embodiment of the present invention. In the FIG. 2, the same parts as compared with FIG. 1 are identified by the same reference numeral. The main difference between FIG. 1 and FIG. 2 is that a collar 30 is substituted for bolt 19 of FIG. 1 as the restricted means of the present invention.

Namely, a bore 10c of the housing 1a is formed to the stepped bore having a large-diameter portion and small-diameter portion, and a circular recess 31 is formed on an end surface of the housing 1a in contact with the housing 1b. A cylindrical collar 30 is fitted into the large-diameter portion of the bore 10c, and a circular flange portion 30b, formed on the outer surface of the collar 30, is nipped between the recess 31 and the housing 1b.

A stepped bore 30a, which comprises a small-diameter portion having the same diameter as the small-diameter portion of the bore 10c and a large-diameter portion having substantially the same diameter as the large diameter land of the first piston 11, is formed on an inner surface of the collar 30 and the first piston 11 is slidably and fluid-tightly fitted into the stepped bore 30a. One end of the collar 30 is located in the low-pressure chamber 20b of the hydraulic booster 20, and the other end of it is provided with a circular flange portion 30c having a diameter smaller than the lands of the second piston 15 and contacts an end portion of the second piston 15 of the large diameter portion of the bore 10c. This flange portion 30c is separated from the land of the second piston 15 of the first pressure chamber 12 by a distance S1 when normally positioned as shown by FIG. 2. Also, a circular groove 30d is formed on the circumferential surface of the collar 30, and the first fluid chamber 13 is communicated with the reservoir 41 via a hole 30e, the circular groove 30d and the port 13a. At the flange portion 30c, a groove 30f, for communication with between the first pressure chamber 12 and the port 12a is formed thereon.

According to this embodiment, the sliding movement of the second piston 15 toward the first piston 11 is restricted by the collar 30. Moreover, the distance S1 is adjusted by suitably exchanging the axial length of the collar 30. Also, a cut-off valve 60 is disposed into the third hydraulic passage 73 and a check valve 60a is positioned in the third hydraulic passage 73 parallel with respect to the cut-off valve 60. The cut-off valve 60 is a two port-two position solenoid operated directional control valve arranged to be opened-closed by the third hydraulic passage 73 due to energization of a solenoid coil 60b by a relay 80 in response to the electric output signal from a fluid measure sensor 41a provided in the reservoir 41. The cut-off valve 60 is constituted as a normally opened valve in this embodiment. Accordingly, the boost chamber 20a is in fluid communication with the second fluid chamber 17 normally, and then, for example, when the lack of the brake fluid measure is detected by the fluid measure sensor 41a, the relay 80 is operated and the solenoid coil 60b is energized. Thereby, the cut-off valve 60 is positioned in a closed position and the third hydraulic passage 73 is closed. Also, the cut-off valve 60 may be a normally closed valve as occasion demands, and in this case, the cut-off valve 60 is operated oppositely with respect to the foregoing description. Also, the cut-off valve 60 may be operated in response to pressure sensor (not shown) detecting the output hydraulic pressure of the power source 40 instead of the fluid measure sensor 41a.

When the output hydraulic pressure of the hydraulic booster 20 has been lost as in the first embodiment, the valve member 18a closes the small hole 15d by the sliding movement of the second piston 15 due to the brake pressure of the first pressure chamber 12, and then the brake pressure of the second pressure chamber 16 is increased and the operation as the ordinary tandem master cylinder is insured. When leakage of the brake fluid is generated in the hydraulic circuit including the wheel cylinders 51a and 52a of the front wheels 51 and 52, the fluid measure in the reservoir 40 is decreased and the detecting signal from the fluid measure sensor 41a is outputted, and the relay 80 operates and the cut-off valve 60 is changed over to the closed position. Thereby, an outflow of the boost pressure to the hydraulic circuit communicated with the second pressure chamber 16 is prevented and the braking force is operated to the rear wheels 53 and 54 by the operation of the hydraulic booster 20.

Figure 3:
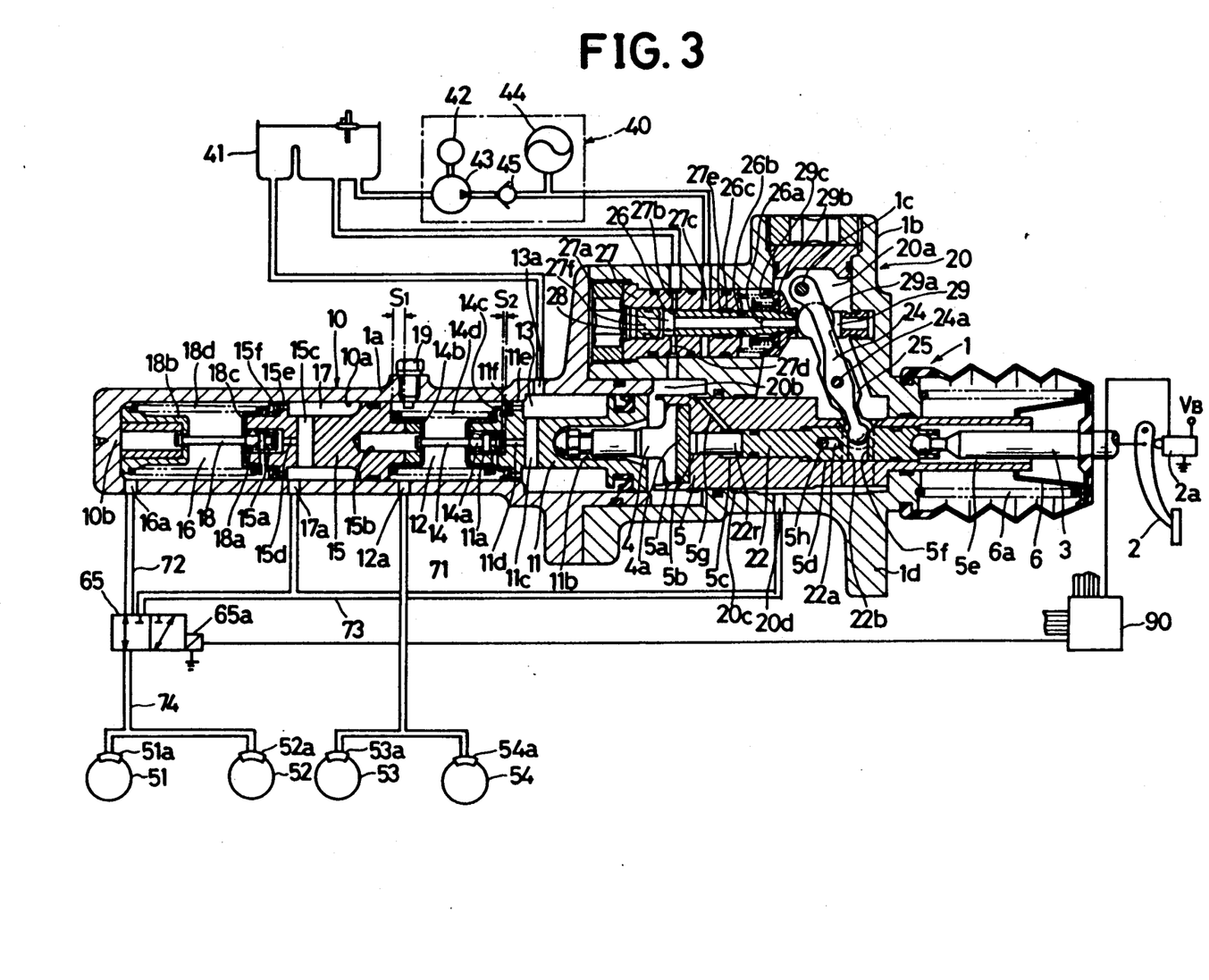
FIG. 3 is a schematic illustration of a hydraulic braking system of a third embodiment of the present invention.

FIG. 3 shows a third embodiment of the present invention which is characterized in that a changeover valve 65 disposed in the second hydraulic passage 72 communicating the second pressure chamber 16 with the wheel cylinders 51a and 52a so as to divide the second hydraulic passage to the second hydraulic passage 72 communicating with the second pressure chamber 16 and the fourth hydraulic passage 74 communicating with the wheel cylinders 51a and 52a. In the FIG. 3, the same identified parts as compared with FIG. 1 utilize the same numerals as FIG. 1.

The changeover valve 65 constitutes a three port-two position solenoid operated directional control valve operated by the solenoid 65a. The changeover valve 65 is changed between a first position communicating the second hydraulic passage 72 with the fourth hydraulic passage 74 and closing the third hydraulic passage 73 at normal condition and the second position communicating the third hydraulic passage with the fourth hydraulic passage 74 and closing the second hydraulic passage 72 during the operating condition. When the changeover valve is in the first position, the wheel cylinders 51a and 52a are in fluid communication with the third hydraulic passage 73, the second fluid chamber 17, the second pressure chamber 16, the port 16a, the second hydraulic passage 74. The changeover operation of the changeover valve 65 between the first position and the second position is controlled by the electric control device 90 inputting a brake operation signal of a brake pedal switch 2a which is opened or closed in response to the operation of the brake pedal 2 as an electric control signal. Namely, under the condition which an engine (not shown) is operating or the power source 40 is operating, the electric control device 90 operates the changeover valve 65 by means of outputting an energizing signal to the solenoid 65a when the brake pedal 2 is operated. Accordingly, under the condition in which an engine is not operating or the power source 40 is not operating, the changeover valve 65 is positioned in the first position. The changeover valve 65 is operable as mentioned above by means of being connected the brake pedal switch 2a to an engine switch (not shown) in series, but in this embodiment, control of the changeover operation of the changeover valve 65 in response to the driving condition by the electric control device may be utilized. For example, the changeover operation of the changeover valve 65 may be controlled as follows. When the brake operation signal of the brake switch 2a is outputted, the changeover valve 65 is operated and then the changeover valve 65 rendered inoperative after predetermined time; or the changeover valve 65 is operated when the brake operation signal of the brake switch 2a is outputted once and the changeover valve 65 is not operated when the power source assumes the nonoperating condition; further, the changeover valve 65 would be inoperable while anti-lock control is operated; and so on.

In this embodiment, in the condition which the brake pedal 2 is not depressed as shown in FIG. 3, the brake fluid which is filled in the first fluid chamber 13, the first pressure chamber 12, the first hydraulic passage 71 and the wheel cylinders 53a and 54a is under the same pressure as the reservoir 41, namely atmospheric pressure, as in FIG. 1. Also, the hydraulic booster 20 is not operated and since the changeover valve 65 is positioned in the first position, the brake fluid which is filled in the second fluid chamber 17, the second pressure chamber 16, the second hydraulic passage 72, the fourth hydraulic 74 and the wheel cylinders 51a and 52 is under the same pressure as the pressure in the reservoir 41. When the brake pedal 2 is depressed, the brake switch 2a is operated and the changeover valve 6 is operated by the electric control device 90, thereby the changeover valve 65 is changed over to the second position in which the third hydraulic passage 73 is communicated with the fourth hydraulic passage 74 and the second hydraulic passage 72 is closed. Also, the hydraulic booster 20 is operated and the output pressure (boost pressure) of the hydraulic booster 20 is supplied to the second fluid chamber 17 via the port 20d, the third passage 73 and the port 17a. At the same time, the output pressure of the hydraulic booster 20 is directly supplied to the wheel cylinders 51a and 52a via the third hydraulic passage 73, the changeover valve 65 and the fourth hydraulic passage 74. At this time, since the second pressure chamber 16 is in a fluid-tightly sealed condition, the second piston 15 does not slide toward the closed wall 10b. Accordingly, in this embodiment, even though the brake pedal 2 is depressed suddenly, the urging force to the brake pedal 2 is not added to the first piston 11 which was sliding toward to the second piston 15 and a reaction is not generated in the brake pedal 2.

When power hydraulic pressure is lost by damage and so on to the power source 40, the changeover valve 65 is changed over to the first position by the electric control device 90. Thereby, even though operation of the hydraulic booster 20 is stopped and the boost force is lost, the operation as with the ordinary tandem master cylinder is insured as in the above described embodiments.

Figure 4:
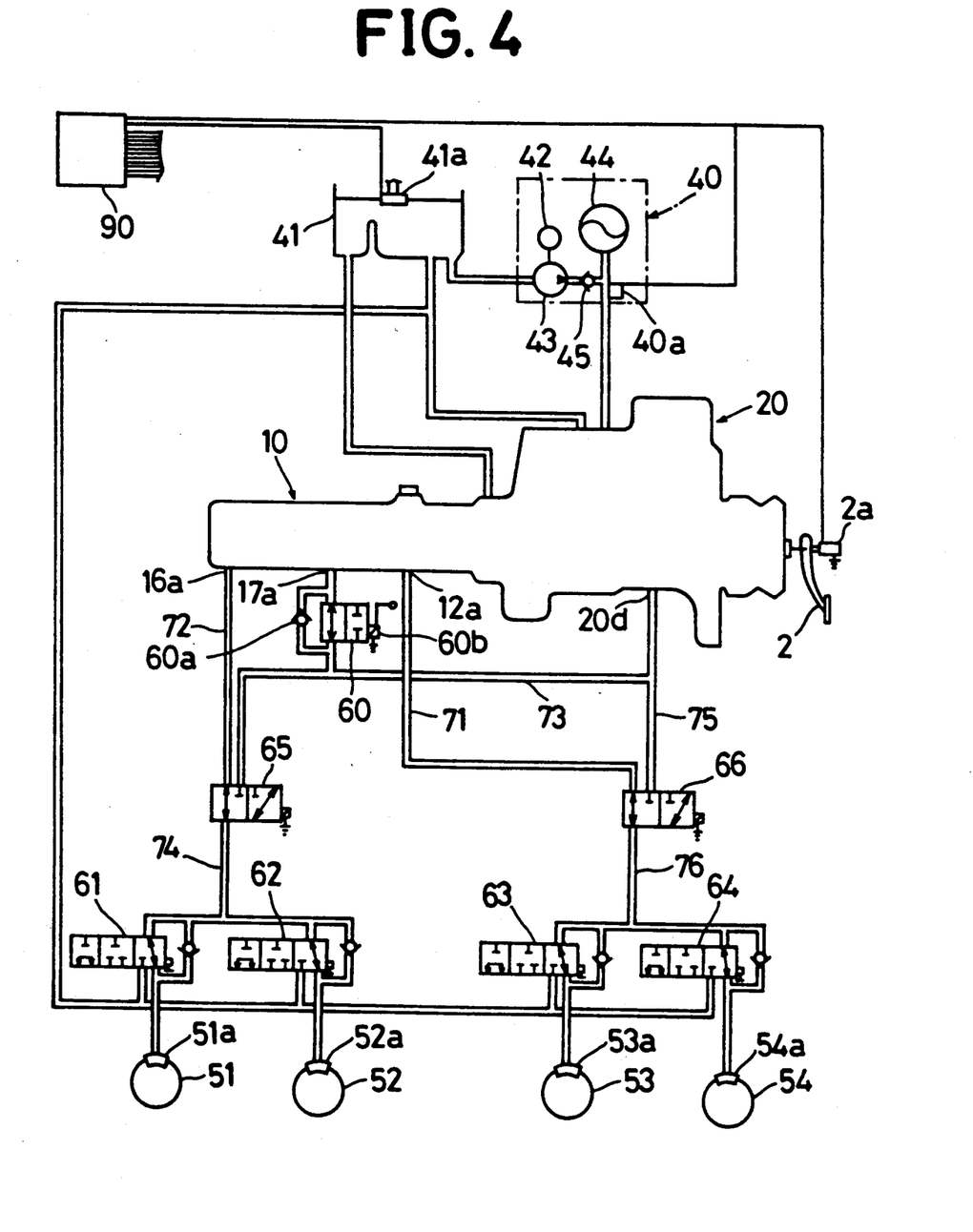
FIG. 4 is a schematic illustration of a hydraulic braking system of a fourth embodiment of the present invention.

FIG. 4 shows a fourth embodiment of the present invention which comprises in a cut-off valve 60 disposed in the third hydraulic passage 73 communicating with the second fluid chamber 17 as in the second embodiment shown in FIG. 2 and a changeover valve 66 and a control valves 61 and 64 provided for an anti-lock control arrangement. In FIG. 4, the same parts as compared with FIG. 3 are identified by the same referencenumeral utilized in FIG. 3.

The cut-off valve 60 is disposed in the third hydraulic passage 73 and a check valve 60a is disposed in the third hydraulic passage 73 parallel with respect to the cut-off valve 60. The cut-off valve 60 is a two port-two position solenoid operated directional control valve arranged to open-close the third hydraulic passage 73 and is energized by a solenoid coil 60b by the electric control device 90 in response to the electric output signal from a fluid measure sensor 41a provided in the reservoir 41 or a pressure sensor 40a provided with the power source 40. The cut-off valve is constituted as a normally open valve in this embodiment. Accordingly, the boost chamber 20a is in fluid communication with the second fluid chamber 17 normally, and then, for example, when the lack of brake fluid is detected by the fluid measure sensor 41a or the decrease of the power hydraulic pressure is detected by the pressure sensor 40a, the solenoid coil 60b is energized by the electric control device 90. Thereby, the cut-off valve 60 is positioned in a closed position and the third hydraulic passage 73 is closed.

The changeover valve 65 is connected to the wheel cylinders 51a and 52a of the front wheels 51 and 52 via the control valves 61 and 62, respectively. The control valves 61 and 62 are three port-three position solenoid operated directional control valves and operate in such manner that the wheel cylinders 51 and 52 in fluid communication with the changeover valve 65, interrupt the fluid communication to changeover valve 65 and establish fluid communication to the reservoir 41 at a first position, a second position and a third position, respectively. Normally, the control valves 61 and 62 are held at the first position for performing the usual brake operation and are transferred to an alternate position upon lock condition for regulating the brake pressure.

As to the rear wheels 53 and 54, the control valves 63 and 64 are the same as the control valves 61 and 62 and are connected to the wheel cylinders 53a and 54a of the rear wheels 53 and 54, but the control valves 63 and 64 are connected to the changeover valve 66 which is a three port-two position solenoid operated directional control valve. Thereby, the control valves 63 and 64 are communicated with the first hydraulic passage 71 communicated with the first pressure chamber of the tandem master cylinder 10 via the port 12a at normal condition and are communicated with a fifth hydraulic passage 75 communicated with the boost chamber of the hydraulic booster 20 via the port 20d when the anti-lock control is operated. The changeover valves 65 and 66 are controlled by the electric control device 90 together with control of the control valves 62 to 64 in the anti-lock control operation.

In this embodiment, during the usual braking operation, the cut-off valve 60, the changeover valves 65 and 66 and the control valves 61 to 64 are held in the position as shown in FIG. 4. Therefore, the braking operation of the front wheels 51 and 52 is operated by the output pressure of the hydraulic booster 20 and the braking operation of the rear wheels 53 and 54 is operated by the output pressure of the first pressure chamber 12. The operation the changeover valve 65 by the brake pedal switch 2a is the same as the embodiment shown in FIG. 3.

Next, when the anti-lock control operation is initiated by detecting slip condition of the road wheels 51 to 54, the changeover valves 65 and 66 are operated by the electric control device 90 and the output pressure of the hydraulic booster 20 is supplied to the control valves 61 to 64. In response to the lock condition of the road wheels 51 to 54, the control valves 61 to 64 are suitably changed over among the three positions and the hydraulic pressure in the wheel cylinders 51a and 54a is regulated.

Further, in this embodiment, since the fluid communication between the tandem master cylinder 10 and the control valves 61 to 64 respectively is interrupted by the changeover valves 65 and 66, respectively, during the anti-lock control operation, the phenomenon in which the brake pedal 2 is moved toward the closed wall 10b by the pressure decrease in the second pressure chamber 16 during the anti-lock control operation is not generated.

Also, in this embodiment, in case the output pressure of the hydraulic booster 20 is lost by the loss of the power hydraulic pressure of the power source 40 and so on or leakage of the brake fluid generated at the wheel cylinders 51a and 52a occurs, the cooperation of the changeover valves 65 and 66 and cut-off valve 60 will ensure or preserve the braking pressure and acts as a fail-safe function. In the former case, the changeover valve 65 is inoperative in the same manner as the third embodiment shown in FIG. 3 and the changeover valve 66 is not operated. Accordingly, the braking operation of the front-rear wheels 51 to 54 is performed by the operation of the tandem master cylinder 10.

In the latter case, in response to the decrease of the brake fluid in the reservoir 41, due to the fluid leakage, fluid measure sensor 41a outputs an electric signal indicating the fluid leakage to the electric control device 90. Then, the electronic control device 90 closes the cut-off valve 60. If this closure of the cut-off valve 60 is performed during the anti-lock control operation, the anti-lock control operation is stopped or terminated and controls the changeover valves 65 and 66 to the position shown in FIG. 4. Since sufficient braking pressure is reserved in the wheel cylinders 53a and 54a which are supplied from the first pressure chamber 12, the fluid-leakage at the wheel cylinders 51a and 52a side is interrupted by the cut-off valve 60 and the output pressure of the hydraulic booster 20 is interrupted by the changeover valves 65 and 66. Consequently, the brake fluid is not leaked from the hydraulic booster 20. Accordingly, the function of the hydraulic booster 20 to be applied to the tandem master cylinder 10 may be maintained.

In the above embodiments, the hydraulic booster 20 is utilized as a dynamic hydraulic braking pressure generator, but it is noted that another booster of the vacuum-operated type may be utilized instead of the hydraulic booster 20. If so, it is required that a pressure regulating mechanism including a member corresponding to the spool valve 28, has to be connected to the second fluid chamber 17 as a separate configuration.

As mentioned above, according to the present invention, as to the hydraulic circuit communicated with the second pressure chamber of the tandem master cylinder, the stroke of the brake pedal is shortened by means of the output pressure of the dynamic hydraulic braking pressure generator to the second fluid chamber of the tandem master cylinder. Further, in addition to above hydraulic circuit, as to the hydraulic circuit communicated with the first pressure chamber of the tandem master cylinder, the first stage idle stroke of the first piston is decreased by the sliding movement of the second piston toward the first piston until stopped by abutting on the restricted means at the first stage of the depression of the brake pedal (the second piston is slidably moved toward the first piston unit abutting on the restricted means after the valve means of the first piston is closed and the volume of the first pressure chamber is decreased at the first stage of the depression of the brake pedal). Accordingly, stroke of the brake pedal is considerably shortened.

Further, according to the present invention, since the brake fluid is filled in the hydraulic circuit which communicates with the first pressure chamber by decrease of the volume of the first pressure chamber due to the sliding of the second piston, the braking force is linear with respect to the stroke of the brake pedal.

Further, according to the present invention, since the second pressure chamber is in a condition which is fluid-tightly closed by the changeover valve when the brake pedal is depressed suddenly, the movement of the second piston is not generated. Accordingly, even though the output pressure of the dynamic hydraulic braking pressure generator is supplied to the second fluid chamber after the operation of the tandem master cylinder, the reaction to the brake pedal is not generated and the smooth braking operation is ensured. Also, due to the normal condition of the changeover valve at its first position, changeover from the dynamic braking operation to the static braking operation by the tandem master cylinder is ensured when the power hydraulic pressure is lost or the engine is stopped.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims

What is claimed is:

1. A hydraulic braking system comprising:
   a tandem master cylinder having a bore with an opening and a closed wall at opposite ends thereof formed in a housing, a first piston slidably fitted in said bore so as to define a first pressure chamber and a first fluid chamber therein and operatively connected to a brake pedal, a second piston slidably fitted in said bore so as to define a second fluid chamber adjacent to said first pressure chamber and a second pressure chamber and operatively connected to said first piston, normally open valve means connected to said pistons so as to close passage means formed in said pistons when said pistons are slidably moved in response to depression of said brake pedal, said passage means communicating the fluid chamber and the pressure chamber defined by a respective piston,
   a power source for generating a hydraulic power pressure,
   a dynamic hydraulic braking pressure generator which generates the hydraulic power pressure supplied from said power source in response to depression of said brake pedal, said second pressure chamber normally communicating with said hydraulic braking power generator during braking operation,
   a plurality of wheel cylinders for braking respective road wheels and divided into a first group of wheel brake cylinders in communication with said first pressure chamber through a first hydraulic circuit and a second group of wheel brake cylinders in communication with said second pressure chamber through a second hydraulic circuit, and
   restricting means for restricting the sliding movement of said second piston toward said first piston to at least a predetermined distance for closing said valve means, said second piston being moved toward said first piston by said hydraulic power pressure so as to decrease idle stroke travel of said first piston.

2. A hydraulic braking system as recited in claim 1, wherein said restricting means comprises a bolt which is fixed to said housing between said first piston and said second piston by threaded engagement and which has an end portion projected into said first pressure chamber.

3. A hydraulic braking system as recited in claim 1, wherein said restricting means comprises a cylindrical collar fitted into said bore in said first pressure chamber and having a flange at an end portion opposite to said second piston.

4. A hydraulic braking system as recited in one of claims 1 to 3, wherein said dynamic hydraulic braking pressure generator comprises a hydraulic booster including a housing connected to said housing of said tandem master cylinder, an input rod slidably fitted in a boost chamber in said housing so as to be moved in response to the depression of said brake pedal, control valve means for regulating the power hydraulic pressure from said power source in response to the movement of said input rod so as to supply a resulting pressure as boost pressure into said boost chamber and a power piston actuating said first piston in response to said boost pressure.

5. A hydraulic braking system as recited in claim 4, wherein said boost chamber is connected with said second fluid chamber through a cut-off valve.

6. A hydraulic braking system as recited in claim 1, wherein said first hydraulic circuit and said second hydraulic circuit comprise dual hydraulic circuits including a first hydraulic passage communicated with said first pressure chamber and with said first group of wheel cylinders, a second hydraulic passage communicated with said second pressure chamber, a third hydraulic passage communicated with said dynamic hydraulic braking pressure generator and a fourth hydraulic passage communicated with said second group of wheel brake cylinders, wherein said hydraulic braking system further includes a changeover valve which is changed over between a first position communicating said second hydraulic passage with said fourth hydraulic passage and closing said third hydraulic passage and a second position communicating said third hydraulic passage with said fourth hydraulic passage and closing said second hydraulic passage in response to the braking operation, and is moved to said second position when the braking operation is initiated.

7. A hydraulic braking system as recited in claim 6, wherein said changeover valve is a solenoid operated valve, and said changeover valve is normally in said first position and is changed over to said second position when a switching means, provided with said brake pedal, is closed.

8. A hydraulic braking system for a vehicle comprising:
- a tandem master cylinder having a bore with an opening and a closed wall at opposite ends thereof formed in a housing, a first piston slidably fitted in said bore so as to define a first pressure chamber and a first fluid chamber therein and operatively connected to a brake pedal, a second piston slidably fitted in said bore so as to define a second fluid chamber adjacent to said first pressure chamber and a second pressure chamber and operatively connected to said first piston, normally open valve means connected with said pistons so as to close passage means formed in said pistons when said pistons are slidably moved in response to depression of said brake pedal, the passage means connecting the fluid chamber and pressure chamber defined by a respective piston,
- a power source for generating a hydraulic power pressure,
- a dynamic hydraulic braking pressure generator which generates the hydraulic power pressure supplied from said power source in response to the depression of said brake pedal, said second pressure chamber normally communicating with said hydraulic braking power generator during braking operation, and said second piston being moved toward said first piston by said hydraulic power pressure so as to decrease idle stroke travel of said first piston,
- a plurality of wheel cylinders for braking respective road wheels and divided into a first group of wheel brake cylinders communicating with said first pressure chamber through a first hydraulic circuit, and a second group of wheel brake cylinders communicating with said second pressure chamber through a second hydraulic circuit, said first and said second hydraulic circuits defining dual hydraulic circuits,
- said dual hydraulic circuits including a first hydraulic passage communicated with said first pressure chamber and with said first group of wheel cylinder, a second hydraulic passage communicated with said second pressure chamber, a third hydraulic passage communicated with said dynamic hydraulic braking pressure generator and a fourth hydraulic passage communicated with said second group of wheel brake cylinders, and
- a changeover valve which is changed over between a first position communicating said second hydraulic passage with said fourth hydraulic passage and closing said third hydraulic passage, and a second position communicating said third hydraulic passage with said fourth hydraulic passage and closing said second hydraulic passage in response to the braking operation, said changeover valve being moved to said second position when the braking operation is initiated.

9. A hydraulic braking system as recited in claim 8, wherein said changeover valve is a solenoid operated valve, and said changeover valve is normally in said first position and is changed over to said second position when a switching means, provided with said brake pedal is closed.

10. A hydraulic braking system as recited in claims 8 or 9, wherein said dynamic hydraulic braking pressure generator comprises a hydraulic booster including a housing connected to said housing of said tandem master cylinder, an input rod slidably fitted in a boost chamber in said housing so as to be moved in response to the depression of said brake pedal, control valve means for regulating the power hydraulic pressure from said power source in response to the movement of said input rod so as to supply a resulting pressure as boost pressure into said boost chamber and a power piston actuating said first piston in response to said boost pressure.

* * * * *